(12) United States Patent
Cherubini et al.

(10) Patent No.: US 8,942,730 B2
(45) Date of Patent: Jan. 27, 2015

(54) METHOD AND SYSTEM FOR FACILITATING EXCHANGE OF ITEMS IN A NETWORK

(75) Inventors: Mauro Cherubini, Madrid (ES); Nuria Oliver Ramirez, Madrid (ES)

(73) Assignee: Telefonica, S.A., Madrid (ES)

( * ) Notice: Subject to any disclaimer, the term of this patent is extended or adjusted under 35 U.S.C. 154(b) by 275 days.

(21) Appl. No.: 13/640,527

(22) PCT Filed: Jun. 25, 2010

(86) PCT No.: PCT/EP2010/059048
§ 371 (c)(1), (2), (4) Date: Dec. 20, 2012

(87) PCT Pub. No.: WO2011/127992
PCT Pub. Date: Oct. 20, 2011

(65) Prior Publication Data
US 2013/0090084 A1    Apr. 11, 2013

(30) Foreign Application Priority Data
Apr. 15, 2010 (ES) .................... 201030543

(51) Int. Cl.
| H04W 24/00 | (2009.01) |
| H04W 40/20 | (2009.01) |
| G06Q 10/04 | (2012.01) |
| G06Q 10/08 | (2012.01) |
| G06Q 30/06 | (2012.01) |
| H04W 4/02  | (2009.01) |
| H04W 4/20  | (2009.01) |

(52) U.S. Cl.
CPC .............. *H04W 40/20* (2013.01); *G06Q 10/047* (2013.01); *G06Q 10/08* (2013.01); *G06Q 30/06* (2013.01); *H04W 4/02* (2013.01); *H04W 4/206* (2013.01)
USPC ...................... 455/456.3; 455/456.1; 455/405; 701/410; 701/420; 701/422

(58) Field of Classification Search
USPC ............... 455/456.1–457, 405; 701/400–413, 701/416, 420, 451, 422
See application file for complete search history.

(56) References Cited

U.S. PATENT DOCUMENTS

| 2003/0069683 A1* | 4/2003 | Lapidot et al. ................ 701/117 |
| 2005/0204379 A1  | 9/2005 | Yamamori |

(Continued)

FOREIGN PATENT DOCUMENTS

JP    2005-114566    4/2005

OTHER PUBLICATIONS

International Search Report dated Mar. 21, 2011 issued in corresponding international patent application No. PCT/EP2010/059048.

*Primary Examiner* — Marcos Torres
(74) *Attorney, Agent, or Firm* — Ostrolenk Faber LLP

(57) ABSTRACT

A method and system for defining a route between a first user and a second user having respective mobile devices. A communication is established between a backend server (13) and a plurality of mobile devices (11) belonging to a respective user of a cellular phone network (12). The mobile devices (11) capture geographical position information and send it towards said backend server (13); said backend server (13) receives geographical position information from the plurality of mobile devices (11) and infers thereof geo-temporal mobility patterns related to each mobile device; said backend server (13) receives information from the cellular phone network (12) about originated and terminated calls of the plurality of mobile devices (11) and constructs thereof call graphs of each mobile device, said call graph comprising frequently used numbers and from where the calls are initiated and terminated; said backend server (13) receives a route definition request between two mobile respectively associated to said first user and said second user; said backend server (13) analyzes said geo-temporal mobility patterns of said mobile devices associated to said first and second users and geo-temporal mobility patterns of the remaining mobile devices included in their call graphs for defining thereto a route between the first and second users; said backend server (13) establishes the route between the first and second users and notifies said route to all mobile devices involved in said route.

13 Claims, 2 Drawing Sheets

(56) References Cited

U.S. PATENT DOCUMENTS

| | | |
|---|---|---|
| 2006/0079247 A1 | 4/2006 | Ritter |
| 2008/0102856 A1 | 5/2008 | Fortescue et al. |
| 2009/0005018 A1 * | 1/2009 | Forstall et al. ............. 455/414.1 |

* cited by examiner

METHOD AND SYSTEM FOR FACILITATING EXCHANGE OF ITEMS IN A NETWORK

CROSS REFERENCE TO RELATED APPLICATIONS

The present application is a 35 U.S.C. §371 National Phase conversion of PCT/EP2010/059048, filed Jun. 25, 2010, which claims the benefit of Spanish patent application no. P201030543, filed Apr. 15, 2010, the disclosure of which is incorporated herein by reference. The PCT application was published in the English language.

TECHNICAL FIELD

The present invention relates to a mobile communication system. More particularly, the present invention relates to a system for the delivery of items in an exchange platform.

DESCRIPTION OF THE PRIOR ART

Because of their importance, the basic laws governing human motions have been studied in a plethora of domains: urban planning [Horner, M. W. & O'Kelly, M. E. S. Embedding economies of scale concepts for hub networks design. J. Transp. Geogr. 9, 255-265 (2001)], traffic forecasting [Kitamura, R., Chen, C., Pendyala, R. M. & Narayaran, R. Microsimulation of daily activity travel patterns for travel demand forecasting. Transportation 27, 25-51 (2000)], and the spread of biological [Colizza, V., Barrat, A., Barthélémy, M., Valleron, A.-J. & Vespignani, A. Modeling the worldwide spread of pandemic influenza: baseline case and containment interventions. PLoS Medicine 4, 95-110 (2007); Hufnagel, L., Brockmann, D. & Geisel, T. Forecast and control of epidemics in a globalized world, Proc. Natl. Acad. Sci. USA 101, 15124-15129 (2004)] and software viruses for mobile devices [Kleinberg, J. The wireless epidemic. Nature 449, 287-288 (2007)]. With the aim of modeling the spread of influenza, Brockmann and colleagues [Brockmann, D., Hufnagel, L. and Geisel, T. The scaling laws of human travel. Nature 439 (2006)] studied human travels using trajectories of about half million one-dollar bills in the United States, (collecting the dataset using the bill tracking system www.whereisgeorge.com—last retrieved February 2010). Stochastic combinatorial optimization algorithms have been applied successfully to logistic applications of vehicle routing with time windows [Bent, R. & Van Hentenryck, P. A two-stage hybrid local search for the vehicle routing problem with time windows. Transportation Science 38, 4, 515-530 (2004)], thus highlighting its complexity. To date little work uses stochastic information for dynamic vehicle routing. An individual's behaviour over a specific day can be approximated by models that can accurately analyse, predict and cluster multimodal data from that individual and communities within the social network of a population, [N. Eagle, A. Pentland, "Eigenbehaviors: identifying structure in routine", Behavioral Ecology and Sociobiology, vol 63, May 2009].

There exist several examples of web portals that support exchange of goods or services. "EasySwap" (http://easyswap.org/—last retrieved February 2010) is a notable example of service that promotes the well being of the users by encouraging them to make unused goods, services and capabilities available to others. The limit of this kind of services is that they rely on the users to route the object from the lender to the borrower. There are many other examples on the Internet of barter exchange: "u-exchange" (http://www.u-exchange.com—last retrieved February 2010), "freecycle" (http://www.freecycle.org—last retrieved February 2010—, "trade to save" (http://www.tradetosave.co.nz/—last retrieved February 2010), just to name a few. Existing solutions rely on the users to decide when and how to route the item from the lender to the borrower. In the case in which the parties decide to rely on a parcel service, the cost of the service might exceed the cost of the item. In the majority of the circumstances, the transfer of good of small value might be simply not practical and completely unsupported by current solutions for bargain exchanges.

SUMMARY OF THE INVENTION

In order to overcome the above mentioned drawbacks, a method and system for establishing a route is defined for the optimization of a delivery route by applying stochastic combinatorial optimization to human mobility patterns as inferred from call detail records (CDR) and location information. Besides, involvement of other peers in the exchange is considered based on the social network constructed from these CDRs information.

In a first aspect, a method for defining a route between a first user and a second user having respective mobile devices is disclosed. The method establishes communication between a backend server and a plurality of mobile devices, each of said mobile devices belonging to a user of a cellular phone network. The method comprises: said plurality of mobile devices capturing geographical position information and sending said geographical position information towards said backend server; said backend server receiving geographical position information from the plurality of mobile devices and inferring thereof geo-temporal mobility patterns related to each mobile device; said backend server receiving information from the cellular phone network about originated and terminated calls of the plurality of mobile devices and constructing thereof call graphs of each mobile device, said call graph comprising frequently used numbers and from where the calls are initiated and terminated; said backend server receiving a route definition request between two mobile devices belonging to the plurality of mobile devices, said two mobile devices being respectively associated to said first user and said second user; said backend server analysing said geo-temporal mobility patterns of said mobile devices associated to said first and second users and geo-temporal mobility patterns of the remaining mobile devices, belonging to the plurality of mobile devices and included in their call graphs for defining thereto a route between the first and second users; said backend server establishing the route between the first and second users and notifying said route to all mobile devices, belonging to the plurality of mobile devices, involved in said route.

Preferably, the geo-temporal mobility patterns comprise frequently visited locations, time spent on said locations and recurrence of said visits.

In a preferred embodiment, the plurality of mobile devices send geographical position information to the backend server comprising cell-ID information and GPS coordinates.

The backend server preferably uses call detail records of said plurality of mobile devices in order to collect called phone numbers in originated calls and caller phone numbers in terminated calls.

The backend server defines the route by performing at least one of the following operations: minimizing the number of mobile devices involved in the route; minimizing the time to reach the final destination; giving priority to locations with the maximum probability that two users will be present for the same period of time.

The users of the cellular phone network preferably interact with the backend server through a web-based application that allows them to input a route definition request. In a preferred embodiment, the web-based application is accessed either from a desk-top based browser or from a mobile device.

In another aspect, a system for defining a route between a first user and a second user, having respective mobile devices, is described. It comprising: a plurality of mobile devices, each of said mobile devices belonging to a user of a cellular phone network, said mobile devices being configured for capturing and transmitting regularly geographical position information; and a backend server configured for: receiving geographical position information from said plurality of mobile devices and inferring thereof geo-temporal mobility patterns related to each mobile device; receiving from the cellular phone network information about originated and terminated calls of the plurality of mobile devices and constructing thereof call graphs of each mobile device, said call graph comprising frequently used numbers and from where the calls are initiated and terminated; receiving a route definition request between two mobile devices belonging to the plurality of mobile devices, said two mobile devices being respectively associated to said first and second users; analysing geo-temporal mobility patterns related to said mobile devices associated to said first and second users and geo-temporal mobility patterns of the remaining mobile devices belonging to the plurality of mobile devices and included in their call graphs for defining thereto a route between the first user and the second user; establishing the route between said first and second users and notifying said route to all mobile devices, belonging to the plurality of mobile devices, involved in said route.

The geo-temporal mobility patterns preferably comprise frequently visited locations, time spent on said locations and recurrence of said visits.

The plurality of mobile devices preferably comprises a software application that sends location information to the backend server comprising cell-ID information and GPS coordinates.

The backend server (13) preferably uses call detail records of said plurality of mobile devices in order to collect called phone numbers in originated calls and phone numbers of the initiating caller in terminated calls.

The backend server preferably comprises: a data logger configured for collecting information from said plurality of mobile devices and from the cellular phone network; a data storage repository for storing the information received from the plurality of mobile devices and from the cellular phone network (12) through the data logger; a classifier configured for analysing the location information collected by the data logger and determining the frequently visited locations of each mobile device belonging to said plurality of mobile devices, the time spent on said locations and the recurrence of said visits; a social network analyser configured for analysing information from the data logger regarding called phone numbers by the mobile device as well as phone numbers from where the mobile device terminated calls are initiated and constructing a call graph of most frequently used numbers corresponding to other service users; a user profile repository for storing information from the classifier and the social network analyser corresponding to all users; a logistic planner configured for using profiles of users comprising geo-temporal mobility patterns information as well as information on the used numbers call graph of said first and second users to define a route from the geographical locations normally visited by the first user to the geographical locations normally visited by the second user, performing a multidimensional optimization; a notifier which is informed by the logistic planner about the defined route and informs the users involved in said route of the times and locations at which the users must meet. The logistic planner preferably defines the route by performing at least one of the following operations: minimizing the number of mobile devices involved in the route; minimizing the time to reach the final destination; giving priority to locations with the maximum probability that two users will be present for the same period of time.

In summary, a method and system for establishing a route is described. Stochastic combinatorial optimization is applied to human mobility patterns as inferred from call detail records (CDR) and location information. Besides, involvement of other users or peers in the exchange of an item is considered, based on the social network constructed from these CDRs information.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures.

Corresponding numerals and symbols in the different figures refer to corresponding parts unless otherwise indicated.

DESCRIPTION OF THE PREFERRED EMBODIMENT

This disclosure relates to a communication method and system for defining a route within an exchange platform where people lend each other items of preferably small value (such as ski boots or a star-shaped screwdriver). Items are exchanged for free, no real money is involved. Items are insured by credit card and are transported by the owners or by carriers (owner's friend or acquaintance in a social network). Participants in the program are not required to change their daily routines in order to deliver the items.

Figure 1:
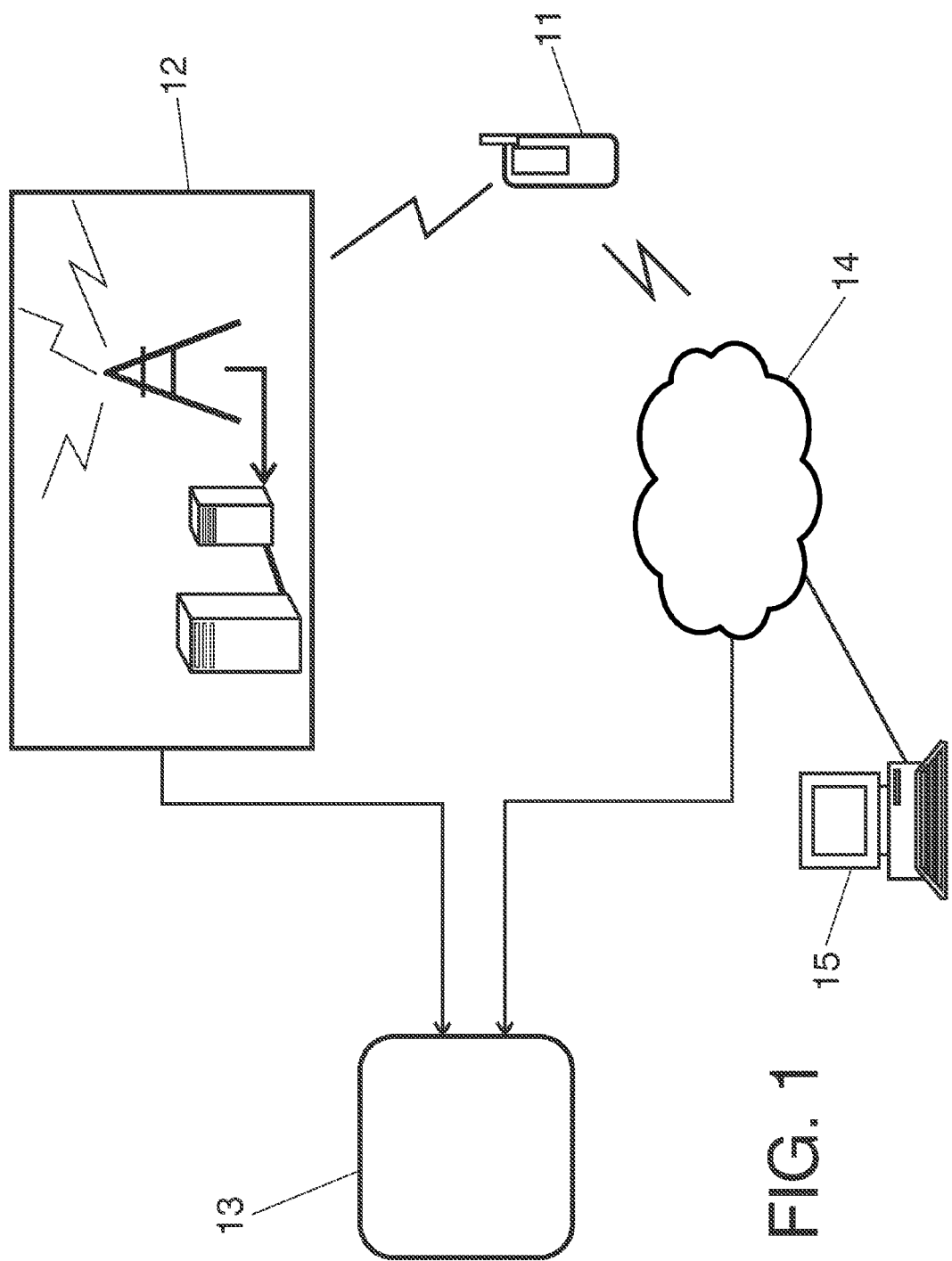
FIG. 1 is a general scenario of the communication method and system comprising all elements involved.

As it is shown in FIG. 1, the system comprises a plurality of mobile devices 11 belonging to a cellular mobile network 12 and a backend server 13. Each mobile device 11 captures regularly the position of a user and this information together with his/her social interactions (destination and origin of voice calls, SMSs, MMSs, etc) is received by the backend server 13 which uses it for inferring spatio-temporal mobility patterns. In the case of delivery of a shared item, the system computes the optimized times at which the item can be passed onto a next person. The user is reminded and alerted through the mobile device 11.

The system comprises a backend server 13 that constantly logs the geographical position of the user. This is achieved combining two different strategies: the first technique that can be applied is to access to the user call detail records (CDR) and therefore simply collect anonymous information on the numbers s/he calls and from where the calls are initiated; the second technique comprises installing a software application in the plurality of mobile devices 11 the users use that sends location information to the backend server 13 (i.e., Cell-ID information and/or GPS coordinates). Preferably both strategies are used, although alternatively only one can be used.

In addition, the users of the system interact with the backend server 13 through a web-based front-end 14 that allows them to input the items they intend to lend to other friends, choose items they intend to borrow from other friends, and modify their profile information. The web-based front-end 14 can be accessed both from a desktop-based browser 15 and from the browser of the mobile device 11.

Figure 2:
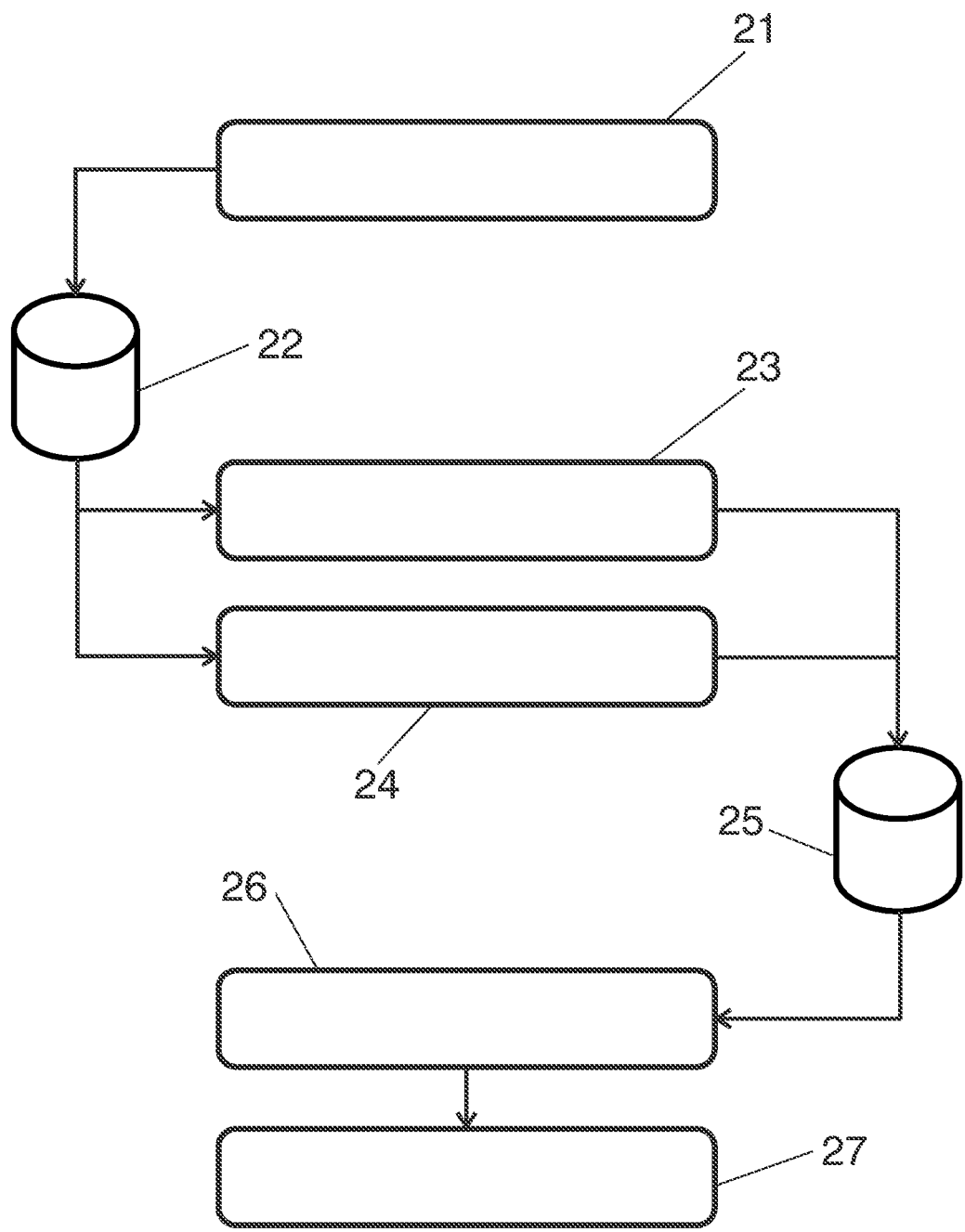
FIG. 2 is a block diagram of the backend server according to the invention.

The backend server 13 achieves different functions. In FIG. 2 the modules of the backend server 13 are shown. First the backend server 13 collects all the call detail records (CDR) provided by the mobile cellular network as well as the location information of the mobile device through a data logger 21 and stores it in a data storage repository 22. After an extensive period of collection, a classifier 23 parses this information and determines the location of residence of the user, the location in which s/he typically spend workdays (i.e., work location), and the locations of the city in which the user performs recurring activities during the week (e.g., the gym). Additionally, the backend server 13 comprises a social network analyser 24. Given the call history, the social network analyzer 24 constructs the call graph of the most frequently called numbers corresponding to potential family members, friends, and acquaintances. The outputs of the classifier 23 and of the social network analyzer 24 are stored into a user profile 25 that is used by the logistic planner 26, explained below.

The logistic planner 26 takes care of executing logistic assignments as dictated by users' choices in the web-based frontend. Thus, the logistic planner 26 determines how to route an item from a first user (the lending-peer) to a second user (the borrowing-peer). It has access to the geo-temporal patterns of the lending-peer and the borrowing-peer through the classifier 23. But, in addition, it has access also to the geo-temporal patterns of other users or peers comprised in the lending and borrowing peers' social networks as phone numbers and call detail record information on these peers is passed through the social network analyser 24. Therefore, it performs a multidimensional optimization to route the item from the geographical locations normally visited by the lending-peer to the geographical locations normally visited by the borrowing-peer. The logistic planner 26 takes advantage of the locations normally visited by the other peers in the social network corresponding to other users of the system and operates at least one of the following optimizations:

- minimizes the number of hops that the item has to travel for reaching the borrowing-peer;
- minimizes the time that it will take to reach the final destination;
- prefers locations with the maximum probability that two peers will be present for the same period of time.

Preferably, the three optimizations are performed.

Once identified and established the optimal route, the logistic planner communicates it to the notifier 27, which takes responsibility to inform the users or peers involved into the transfer of the item about the times and locations at which the item has to be transferred from one peer to the next.

An advantage of this method and system for defining a route is to allow delivery of items between friends without any involvement of any parcel service and money to pay the delivery of the goods. The users of the system are not asked to change their daily routines to deliver the items and no extra energy is wasted to transport them to their final destinations and back to its owner.

Thus, a route is established between two users, through which items can be swapped with dramatic benefits for the environment and personal finance of the involved parties.

What is claimed is:

1. A method for defining a route between a first user and a second user having respective mobile devices, said method establishing communication between a backend server and a plurality of mobile devices, each of said mobile devices belonging to a user of a cellular phone network, the method comprising:
   a. said plurality of mobile devices capturing geographical position information and sending said geographical position information towards said backend server;
   b. said backend server receiving geographical position information from the plurality of mobile devices and inferring thereof geo-temporal mobility patterns related to each mobile device;
   c. said backend server receiving information from the cellular phone network about originated and terminated calls of the plurality of mobile devices and constructing thereof call graphs of each mobile device, said call graph comprising frequently used numbers and from where the calls are initiated and terminated;
   d. said backend server receiving a route definition request between two mobile devices belonging to the plurality of mobile devices, said two mobile devices being respectively associated to said first user and said second user;
   e. said backend server analysing said geo-temporal mobility patterns of said mobile devices associated to said first and second users and geo-temporal mobility patterns of the remaining mobile devices, belonging to the plurality of mobile devices and included in their call graphs for defining thereto a route between the first and second users;
   f. said backend server establishing the route between the first and second users and notifying said route to all mobile devices, belonging to the plurality of mobile devices, involved in said route.

2. A method of claim 1, wherein said geo-temporal mobility patterns comprise frequently visited locations, time spent on said locations and recurrence of said visits.

3. A method of claim 1, wherein said plurality of mobile devices send geographical position information to the backend server comprising cell-ID information and GPS coordinates.

4. A method of claim 1, wherein said backend server uses call detail records of said plurality of mobile devices in order to collect called phone numbers in originated calls and caller phone numbers in terminated calls.

5. A method of claim 1, wherein said backend server defines the route by performing at least one of the following operations:
   a. minimizing the number of mobile devices involved in the route;
   b. minimizing the time to reach the final destination; and
   c. giving priority to locations with the maximum probability that two users will be present for the same period of time.

6. A method of claim 1, wherein said users of the cellular phone network interact with the backend server through a web-based application that allows them to input a route definition request.

7. A method of claim 6, wherein said web-based application is accessed either from a desk-top based browser or from a mobile device.

8. A system for defining a route between a first user and a second user, having respective mobile devices, the system comprising:
   a. a plurality of mobile devices, each of said mobile devices belonging to a user of a cellular phone network, said mobile devices being configured for capturing and transmitting regularly geographical position information;

b. and a backend server configured for:

i. receiving geographical position information from said plurality of mobile devices and inferring thereof geo-temporal mobility patterns related to each mobile device, ii. receiving from the cellular phone network information about originated and terminated calls of the plurality of mobile devices and constructing thereof call graphs of each mobile device, said call graph comprising frequently used numbers and from where the calls are initiated and terminated;

iii. receiving a route definition request between two mobile devices belonging to the plurality of mobile devices, said two mobile devices being respectively associated to said first and second users, iv. analysing geo-temporal mobility patterns related to said mobile devices associated to said first and second users and geo-temporal mobility patterns of the remaining mobile devices belonging to the plurality of mobile devices and included in their call graphs for defining thereto a route between the first user and the second user, v. establishing the route between said first and second users and notifying said route to all mobile devices, belonging to the plurality of mobile devices, involved in said route.

9. A system of claim 8, wherein said geo-temporal mobility patterns comprise frequently visited locations, time spent on said locations and recurrence of said visits.

10. A system of claim 8, wherein said plurality of mobile devices comprise a software application that sends location information to the backend server comprising cell-ID information and GPS coordinates.

11. A system of claim 8, wherein said backend server uses call detail records of said plurality of mobile devices in order to collect called phone numbers in originated calls and phone numbers of the initiating caller in terminated calls.

12. A system of claim 8, wherein said backend server comprises:

a. a data logger configured for collecting information from said plurality of mobile devices and from the cellular phone network;

b. a data storage repository for storing the information received from the plurality of mobile devices and from the cellular phone network through the data logger;

c. a classifier configured for analysing the location information collected by the data logger and determining the frequently visited locations of each mobile device belonging to said plurality of mobile devices, the time spent on said locations and the recurrence of said visits;

d. a social network analyser configured for analysing information from the data logger regarding called phone numbers by the mobile device as well as phone numbers from where the mobile device terminated calls are initiated and constructing a call graph of most frequently used numbers corresponding to other service users;

e. a user profile repository for storing information from the classifier and the social network analyser corresponding to all users;

f. a logistic planner configured for using profiles of users comprising geo-temporal mobility patterns information as well as information on the used numbers call graph of said first and second users to define a route from the geographical locations normally visited by the first user to the geographical locations normally visited by the second user, performing a multidimensional optimization;

g. a notifier which is informed by the logistic planner about the defined route and informs the users involved in said route of the times and locations at which the users must meet.

13. A system of claim 12, wherein said logistic planner defines the route by performing at least one of the following operations:

a. minimizing the number of mobile devices involved in the route;

b. minimizing the time to reach the final destination; and c. giving priority to locations with the maximum probability that two users will be present for the same period of time.

* * * * *